United States Patent [19]

Fyfe et al.

[11] Patent Number: 4,969,703
[45] Date of Patent: Nov. 13, 1990

[54] OPTICAL FIBER STRIPPER POSITIONING APPARATUS

[75] Inventors: Richard W. Fyfe; Amadeo Sanchez, Jr., both of Las Vegas, Nev.

[73] Assignee: The United States of America as represented by the United States Department of Energy, Washington, D.C.

[21] Appl. No.: 406,017

[22] Filed: Sep. 12, 1989

[51] Int. Cl.$^5$ .............................................. G02B 6/36
[52] U.S. Cl. .................................. 350/96.2; 30/90.1; 81/9.4
[58] Field of Search ................ 350/96.2, 320; 30/90.1, 30/90.4, 90.8, 90.2; 81/9.4, 9.44

[56] References Cited

U.S. PATENT DOCUMENTS

| | | | |
|---|---|---|---|
| 3,864,829 | 2/1975 | Williams | 30/130 |
| 4,059,892 | 11/1977 | Siden | 30/90.1 |
| 4,386,541 | 6/1983 | Robertson et al. | 30/90.1 |
| 4,434,554 | 3/1984 | Korbelak | 30/90.8 |
| 4,643,520 | 2/1987 | Margolin | 350/96.2 |
| 4,748,871 | 6/1988 | Zdzislaw | 30/90.1 |
| 4,805,301 | 2/1989 | Chapin et al. | 30/90.1 |
| 4,850,108 | 7/1989 | Perrino et al. | 30/90.1 |

Primary Examiner—John D. Lee
Assistant Examiner—John Ngo
Attorney, Agent, or Firm—L. E. Carnahan; Roger S. Gaither; William R. Moser

[57] ABSTRACT

An optical fiber positioning apparatus for an optical fiber stripping device is disclosed which is capable of providing precise axial alignment between an optical fiber to be stripped of its outer jacket and the cutting blades of a stripping device. The apparatus includes a first bore having a width approximately equal to the diameter of an unstripped optical fiber and a counter bore axially aligned with the first bore and dimensioned to precisely receive a portion of the stripping device in axial alignment with notched cutting blades within the stripping device to thereby axially align the notched cutting blades of the stripping device with the axis of the optical fiber to permit the notched cutting blades to sever the jacket on the optical fiber without damaging the cladding on the optical fiber. In a preferred embodiment, the apparatus further includes a fiber stop which permits determination of the length of jacket to be removed from the optical fiber.

14 Claims, 5 Drawing Sheets

OPTICAL FIBER STRIPPER POSITIONING APPARATUS

BACKGROUND OF THE INVENTION

The invention described herein arose in the course of, or under, Contract No. DE-AC08-83NV10282 between the U. S. Dept. of Energy and EG&G Energy Measurements, Incorporated.

Optical fibers such as silica glass fibers are normally constructed with a cladding material such as a plastic or glass cladding which is capable of reflecting the light as it is being transmitted through the optical fiber. The clad fiber is then provided with a jacket or buffer material which protects this cladding material when a number of such fibers are bundled together to form a cable.

It is necessary, however, to remove this outer buffer or jacket when it is desired to splice fibers together or to terminate the fiber in a device such as connector, an array body which holds the fibers in proper alignment, etc.

Conventionally, wire strippers which are used to remove insulation from a metal wire, have been used to remove such jacketing or buffer material from optical fibers. Such wire strippers have been produced with various sized openings which generally match the diameter of the wire from which the outer insulation is being removed to avoid mechanical damage such as cutting or scoring of the metal wire which would tend to mechanically weaken the wire resulting in possible breakage of the wire at that point.

An example of such a cutter is found in Perrino et al U.S. Pat. No. 4,271,729, cross-reference to which is hereby made. The cutter described therein is provided with cutting blades having complimentary semicircular notches therein sized, with respect to the diameter of the wire to be stripped, to permit penetration of the insulation without nicking the wire itself.

However, while such wire stripping devices do provide sufficient protection against damage to a metal wire by providing a notch in the cutting blade slightly larger than the diameter of the wire, the use of such a device in removal of the jacket or buffer layer of an optical fiber does not prevent damage to the cladding material on an optical fiber. This is because such wire strippers rely on the relative difference in the hardness of the inner wire versus the insulation to properly center the cutting surfaces of the stripping blades. In other words, provided that the notch or opening in the blades is slightly larger in diameter than the wire, if one of the blades cuts through the insulation and engages the wire before the other blade has severed the insulation, the engaged blade will act to center the wire by urging the wire and insulation thereon toward the blade which has not yet cut through the insulation.

While such wire stripping designs have been successful in preventing scoring damage to a metal wire, they have not prevented damage from occurring to the cladding of optical fibers when such stripping devices are used to remove the outer jacket or buffer material therefrom. This is because damage to the metal wire will not occur unless the blade actually indents the surface of the metal wire, while damage to an optical fiber can occur due to mere scratching of the cladding layer thereon.

Thus, removal of an outer protective jacket or buffer layer from an optical fiber requires not only correct diameter sizing of notched blades of a stripping device with the diameter of the optical fiber, but also precise axial alignment of the cutting blades of the stripper device with the axis of the optical fiber as well.

SUMMARY OF THE INVENTION

It is, therefore, an object of this invention to provide a positioning apparatus for an optical fiber stripping device which will provide precise axial alignment between the optical fiber to be stripped of its jacket and the blades of the stripping device, which positioning apparatus includes a first bore approximately equal in diameter to an unstripped optical fiber and a counter bore in the positioning apparatus which is axially aligned with the first bore and dimensioned to precisely receive a protruding portion of the stripping device which is in axial alignment with notched cutting blades within the stripping device to thereby precisely axially align the notched cutting blades of the stripping device with the axis of the optical fiber to permit the notched cutting blades to sever the jacket on the optical fiber without damaging the cladding on the optical fiber.

It is a further object of the invention to provide such a positioning apparatus which is further provided with means for measuring the amount of the optical fiber to be stripped of its outer jacket by providing a pivotally mounted stop means on a base of the apparatus, which stop means may be pivoted into a position to provide a stop for the end of the optical fiber when determining the length to be stripped; and block means slidably mounted on the apparatus base carrying the first bore which receives the optical fiber, and the counter bore which receives the stripping device, whereby the end of the optical fiber in the first bore may be placed against the stop means on the apparatus base and the block means moved relative to the base and the fiber against the stop means thereon until the desired length of fiber to be stripped has been reached.

These and other objects of the invention will be apparent from the following description and accompanying drawings.

DETAILED DESCRIPTION OF THE INVENTION

Figure 1:
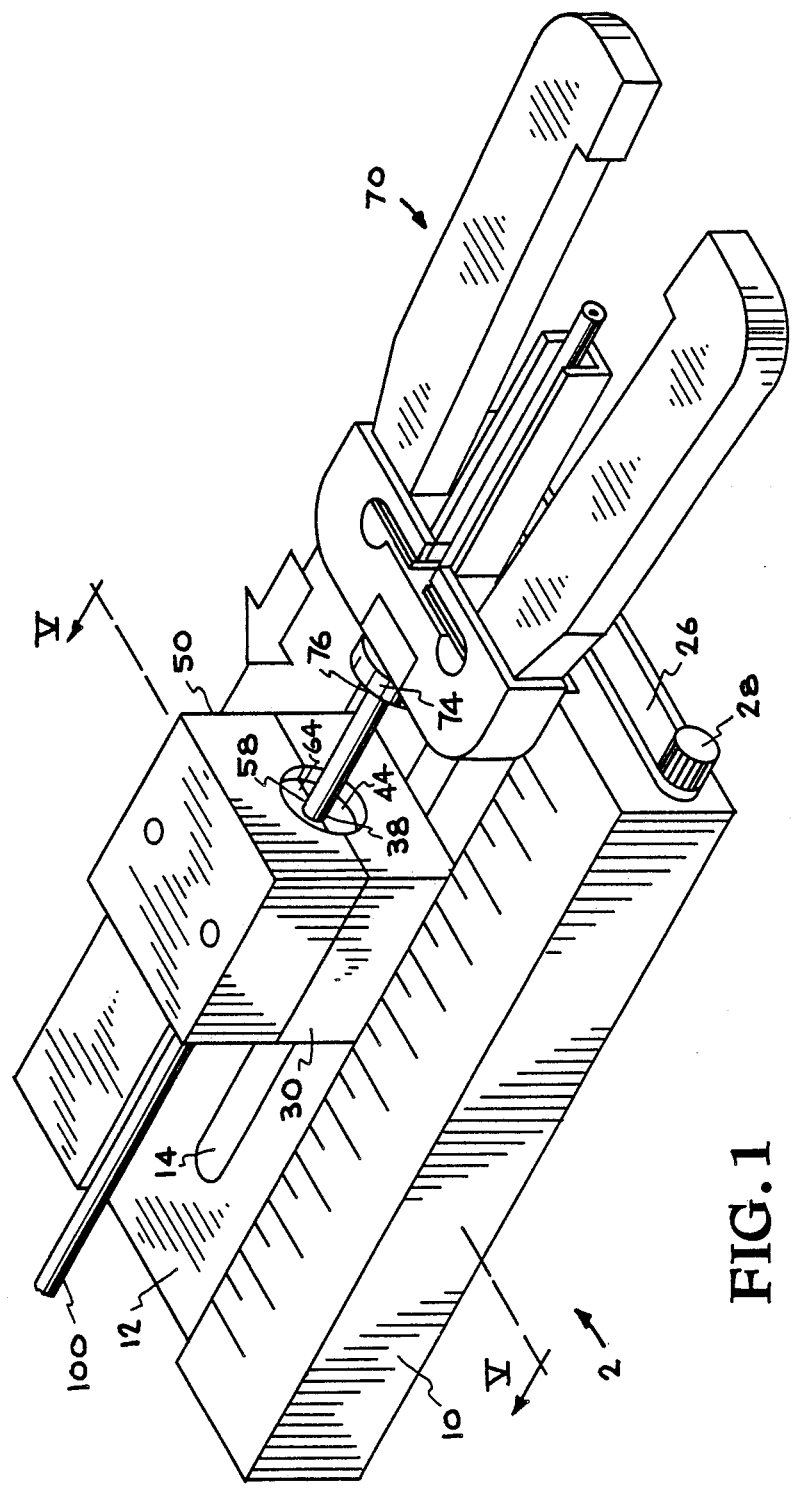
FIG. 1 is an isometric view of the optical fiber stripper positioning apparatus of the invention shown with a stripper tool about to be inserted into the alignment bore of the positioning apparatus.

Turning now to FIG. 1, the positioning apparatus of the invention is generally shown at 2 comprising a base member 10, a first or lower block member 30, a second or upper block member 50. Also shown in FIG. 1 is an optical fiber stripping device 70 as it is about to be inserted into positioning apparatus 2 as will be described below.

The operation of stripping device 70 is described in U.S. Pat. 4,271,729, cross-reference to which is hereby made. As shown in FIG. 1, stripper 70 is provided with a protrusion 74 which contains a central guide bore 76 through which a optical fiber 100 may be fed to generally guide the fiber toward the notches in the cutting blades (not shown) within stripper 70. Stripper 70 is generally provided with removable notched cutting blades which permit one to select a set of blades and notches corresponding to the diameter of the optical fiber and its outer jacket. While stripper 70 is not a part of the present invention it must be noted that the positioning apparatus of the invention cooperates with the stripper in that protrusion 74 on the end of stripper 70 must be in axial alignment with the notches in the stripper's cutting blades for the positioning apparatus of the invention to operate successfully.

Figure 2:
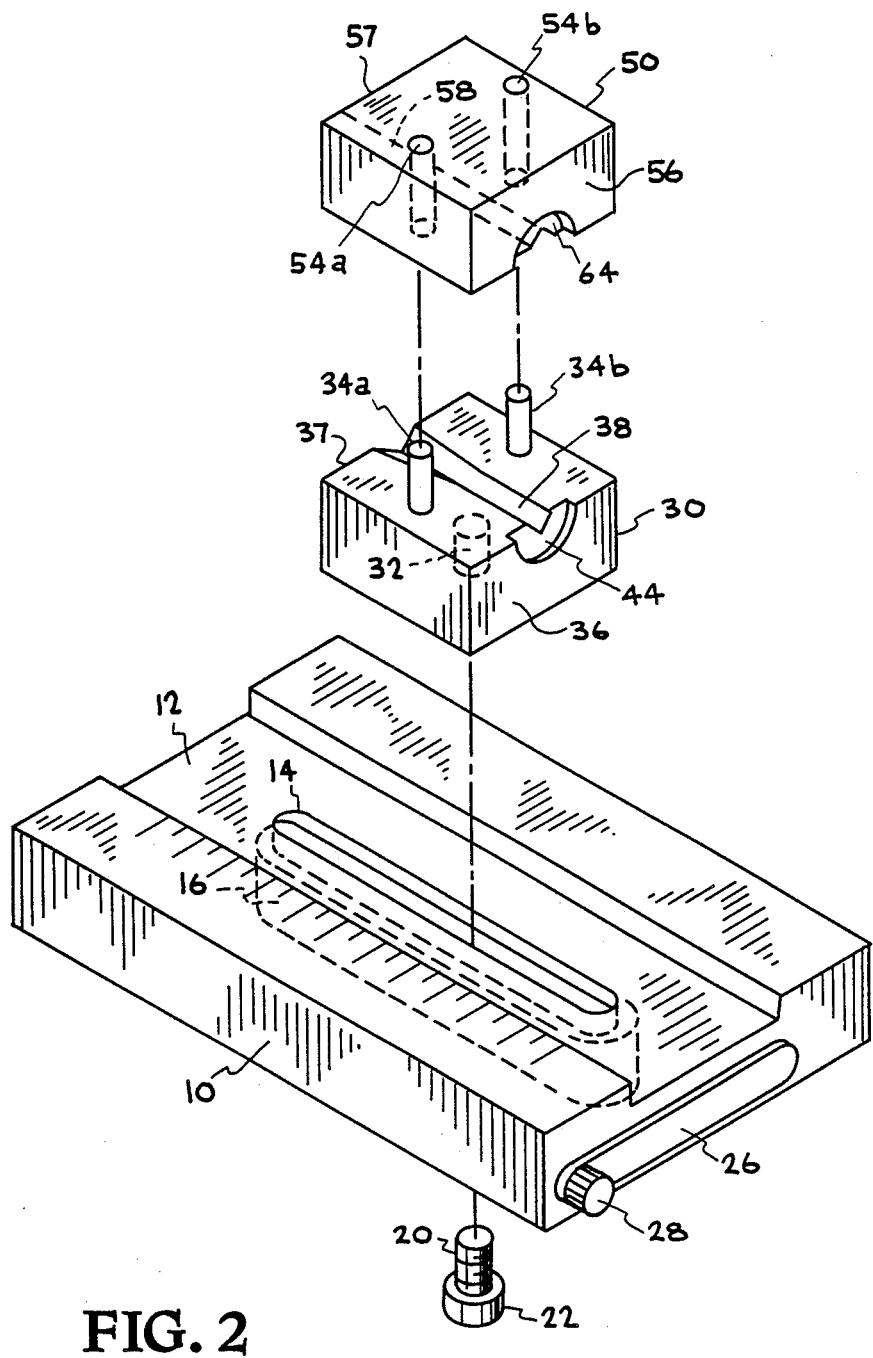
FIG. 2 is an exploded view of the positioning apparatus shown in FIG. 1 illustrating how the upper and lower blocks of the positioning apparatus fit together and how they are slidably mounted on the base of the apparatus.
Figure 4:
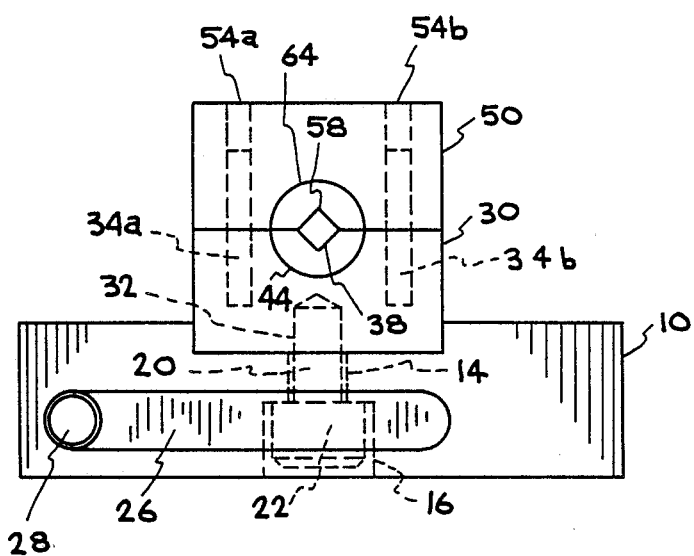
FIG. 4 is a vertical end view of the apparatus showing the coaxial alignment of the small bore which receives the jacketed optical fiber and the larger counter bore which receives the end of the optical fiber stripper and also showing the fiber stop mounted pivotally on the base in a position out of engagement with the optical fiber.
Figure 5:
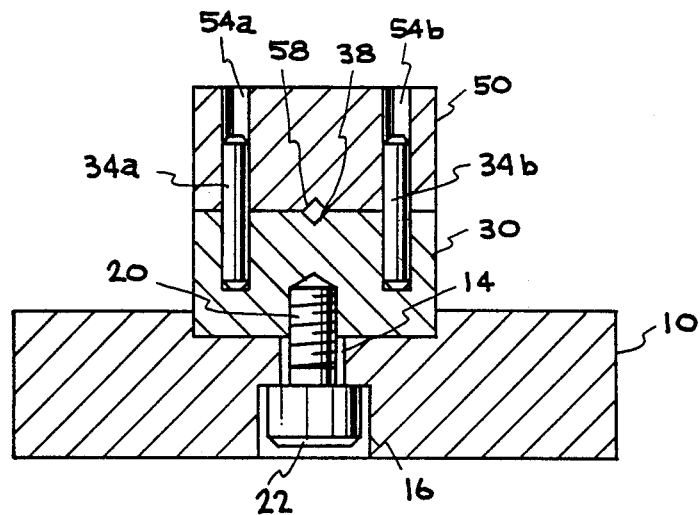
FIG. 5 is a vertical cross-section view of the positioning apparatus of FIG. 1 taken along lines V—V.

Base member 10 comprises a generally rectangular metal member, which may be constructed of steel or aluminum or the like, having a wide groove 12 running the entire length of the top surface of base member 10. Centrally located along groove 12 is an elongated slot 14 which terminates short of each end of groove 12. As shown in FIGS. 4 and 5, slot 14 extends about halfway through the remaining thickness of base member 10 where it intersects a counter slot 16 of wider dimension which passes through the remainder of base member 10. As shown in FIGS. 2, 4, and 5, slot 12 receives the body of a mounting bolt 20 which is used to slidably mount the lower of the two fiber positioning blocks as will be described below. The wider slot 14 receives the head 22 of bolt 20 permitting it to be recessed into the bottom of base 10 so that base 10 will rest flatly on a support surface.

Figure 7:
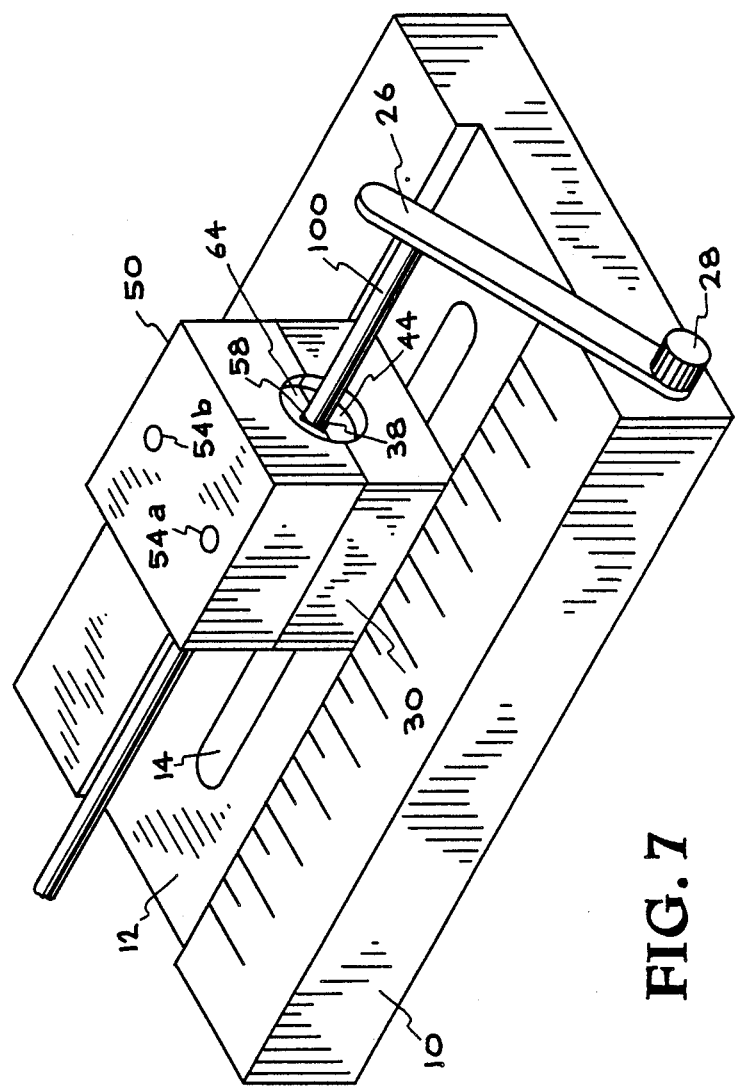
FIG. 7 is an isometric view of the apparatus showing the fiber stop pivoted into engagement with the end of a jacketed fiber which has been inserted into the apparatus.

Pivotally mounted on one end of base member 10 is a fiber stop 26 which is rotably secured to base member 10 by a screw 28. Fiber stop 26 may be rotated upward to act as a fiber stop when it is desired to measure the length of the portion of the optical fiber from which the jacket is to be stripped as shown in FIG. 7.

Still referring to FIG. 1, as well as FIGS. 2 and 4-6, a first positioning block 30, having square or at least rectangular sections, i.e., all opposite surfaces lie in parallel planes, is slidably mounted in wide groove 12 of base member 10. A threaded bore 32 within block 30, which extends upwardly from the bottom surface of block 30, receives bolt 20. When bolt 20 is loosened, block 30 may slide along groove 12 to permit adjustment, in cooperation with fiber stop 26, of the length or amount of the fiber jacket which will be removed from the optical fiber. When the correct length has been determined, bolt 20 is tightened, securing lower block 30 to base member 10.

Protruding vertically from the top surface of block 30 are two alignment pins 34a and 34b which are received in mating bores 54a and 54b of upper block 50 to align the lower surface and end surface 56 of block 50 with the upper surface and end surface 36 of lower block 30 for reasons which will be described below.

The upper surface of block 30 is also provided with a central v-groove 38 which extends along the middle of the top surface of block 30 from end surface 36 to the opposite end surface 37 of block 30, extending generally parallel to the side surfaces of block 30 as well as parallel to groove 12 in base member 10. The depth of v-groove 38, and the width at the top surface of block 30, are both dimensioned to be either just equal to or slightly smaller than the diameter of the jacketed optical fiber to be stripped.

Figure 6:
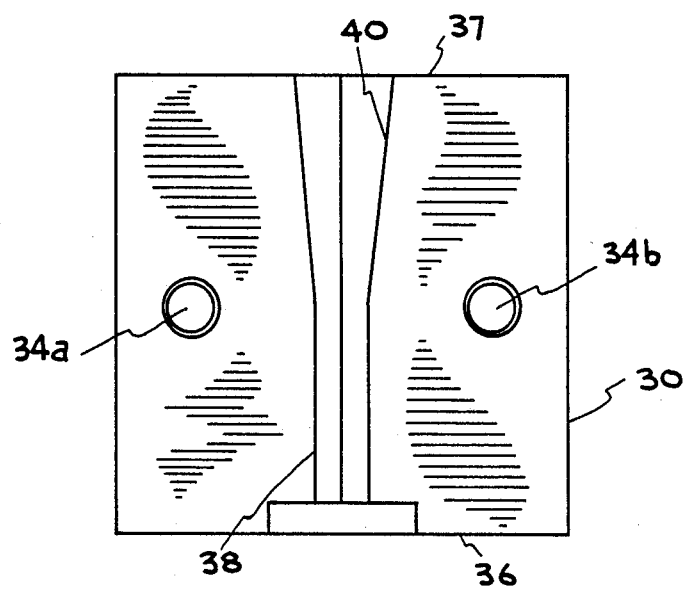
FIG. 6 is a top view of the bottom block in the positioning apparatus of the invention.

Upper block 50, which is of similar dimensions to block 30, is also provided with a v-groove 58 of similar size which extends along the lower surface of block 50 in registry with groove 38 in lower block 30 so that when pins 34a and 34b are inserted into bores 54a and 54b, v-grooves 38 and 58 cooperate to provide a channel which is square in cross-section through which a jacketed optical fiber may be inserted. As best seen in FIG. 6, v-groove 38 is outwardly tapered or flared at 40, as it extends inwardly from end surface 37 and v-groove 58 in block 50 is similarly tapered or flared to facilitate insertion of jacketed optical fiber 100 into v-grooves 38 and 58 via end surfaces 37 and 57 of blocks 30 and 50.

As best seen in FIG. 4, the respective end surfaces 36 and 56 of blocks 30 and 50 are provided with respective counter bores 44 and 64 which are coaxial with the axis of v-grooves 38 and 58 and which have a cross-section which matches a corresponding protrusion 74 on optical fiber stripping tool 70. In the illustrated embodiment, protrusion 74 is cylindrical in cross-section and, therefore, counter bores 44 and 64 define a circular bore coaxial with the axis defined by v-grooves 38 and 58. That is, counter bores 44 and 64 are each semicircular in cross-section.

The operation of the positioning apparatus in the accurate stripping of the jacket from an optical fiber is as follows. Lower block 30 is inserted into groove 12 of base member 10 with the threaded bore 32 facing downward, i.e., with v-groove 38 and alignment pins 34a and 34b facing upward. Threaded bolt 20 is then inserted through slots 14 and 16 into threaded bore 32 and tightened sufficiently to provide a snug fit between block 30 and base member 10 while still permitting block 30 to slide in groove 12 of base member 10. Upper block 50 is then placed over block 30 with alignment pins 34a and 34b inserted into bores 54a and 54b. Fiber stop 26 is then raised to its stop position, as shown in FIG. 7.

Figure 3:
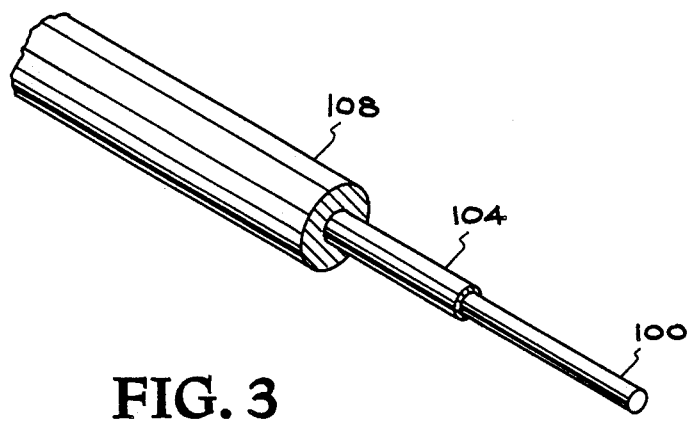
FIG. 3 is a fragmentary partially cutaway side view of a typical jacketed optical fiber showing the outer jacket on the fiber as well as the cladding thereunder which is directly coated over the fiber.

A jacketed optical fiber such as shown in FIG. 3, comprising a central fiber 100, a cladding or optical coating 104, and a jacket 108, is then inserted into the flared portion of the opening or bore defined by v-grooves 38 and 48 from end surfaces 37 and 57 of blocks 30 and 50, i.e., the end surface where the respective grooves have been widened to facilitate insertion of the jacketed optical fiber. The fiber is passed through the grooves until it emerges at end surfaces 36 and 56. The fiber is further fed through grooves 38 and 58 until the end of the optical fiber engages stop 26. Blocks 30 and 50 are then slide back (away from stop 26) in groove 12 until the desired length of the fiber to be stripped is exposed. In this respect, it will be noted that the upper surface of base member 10 may be scribed, as shown in FIG. 1, to provide appropriate length measurements.

Bolt 20 may then be tightened to secure block 30, and block 50 thereon, to base member 10.

Fiber stop 26 is now lowered out of engagement with the optical fiber and the end of the fiber is fed into central bore 76 in optical stripper 70. Stripper 70 is slid along the jacketed optical fiber until protrusion 74 on stripper 70 enters the counter bore defined by recesses 44 and 64 in end respective end surfaces 36 and 56 of blocks 30 and 50. Stripper 70, and the notched cutting blades therein, are now precisely aligned axially with the axis of optical fiber.

Slight downward pressure may now be exerted on upper block 50 to secure the jacketed fiber in the v-grooves while the handles of stripper 70 are compressed, causing the notched blades to sever the jacket of the optical fiber. The stripper handles are then released and stripper 70 is carefully removed from the optical fiber. The severed portion of the jacket on the optical fiber may then be slid off the fiber manually while still maintaining the remainder of the jacketed fiber in the groove or bore between blocks 30 and 50.

The reason for the preferred manual removal of the severed portion of the jacket is that when stripper 70 is removed from the alignment bore formed by recesses 44 and 64, stripper 70 is no longer maintained in precise alignment with the axis of the optical fiber. Therefore, if one attempts to "strip" the jacket from the optical fiber, as one might strip the insulation from a metal wire, one may damage the thin cladding material beneath the jacket by scratching the cladding with the blades of the stripper.

Thus, the optical fiber positioning apparatus of the invention permits properly sized stripping tool to be precisely aligned axially with a jacketed optical fiber so that the notched blades of the stripper will penetrate and sever the jacket without penetrating sufficiently to damage the cladding beneath the jacket on the surface of the fiber. The apparatus further provides clamping of the fiber while stripping of the jacket takes place. This clamping prevents any movement of the fiber without an damage to the buffer and minimal stress to either the core or the cladding of the optical fiber.

While a specific embodiment of the optical fiber positioning apparatus has been illustrated and described for carrying out the removal of the jacket of the optical fiber without damaging the cladding on the optical fiber in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An optical fiber positioning apparatus for an optical stripping device capable of providing precise axial alignment between an optical fiber to be stripped of its outer jacket and a stripping device comprising: a first bore in said positioning apparatus defined by mating grooves formed in faces of two blocks in said apparatus, said bore having a width approximately equal to or slightly smaller than the diameter of an unstripped optical fiber to permit a clamping force to be exerted on said optical fiber to maintain said fiber in axial alignment with the axis of said first bore adjacent said stripping device; and a counter bore in said positioning apparatus axially aligned with said first bore and dimensioned to precisely receive a portion of said stripping device in axial alignment with notched cutting blade within said stripping device to thereby axially align said notched cutting blades of said stripping device with the axis of said optical fiber to permit said notched cutting blades to sever said jacket on said optical fiber without damaging the cladding on said optical fiber.

2. The optical fiber positioning apparatus of claim 1 wherein said first bore in said apparatus comprises a v-shaped portion.

3. The optical fiber positioning apparatus of claim 2 wherein said apparatus further comprises a pair of aligned blocks each having a v-shaped groove formed in the respective mating surface thereof to thereby form a rectangularly cross-sectioned bore.

4. The optical fiber positioning apparatus of claim 3 wherein said pair of aligned blocks are slidably mounted on a base member.

5. The optical fiber positioning apparatus of claim 4 wherein said base member is provided with an elongated groove having a width equal to the width of said aligned blocks to permit insertion of one of said blocks into said groove.

6. The optical fiber positioning apparatus of claim 5 wherein said groove in said base member is further provided with an elongated slot therein and one of said aligned blocks is provided with a threaded bore in a bottom surface thereof to permit insertion of a bolt through said elongated slot into said threaded bore to thereby secure said block to said base member.

7. The optical fiber positioning apparatus of claim 3 wherein pins carried by one of said aligned blocks are received by bores in the other of said aligned blocks to maintain alignment between said blocks.

8. The optical fiber positioning apparatus of claim 3 wherein a portion of said rectangularly cross-sectioned bore is tapered in an outward flare adjacent the opposite end from said counter bore to facilitate insertion of said jacketed optical fiber into said bore.

9. An optical fiber positioning apparatus for an optical fiber stripping device capable of providing precise axial alignment between an optical fiber to be stripped of its outer jacket and the blades of said stripping device comprising: a pair of aligned blocks each having a groove in a mating surface therein to define a first bore in said positioning apparatus having a width approximately equal to the diameter of an unstripped optical fiber; a counter bore in said aligned blocks axially aligned with said first bore and dimensioned to precisely receive a portion of said stripping device which is in axial alignment with notched cutting blades within said stripping device to thereby axially align said notched cutting blades within said stripping device with the axis of said optical fiber to permit said notched cutting blades to sever said jacket on said optical fiber without damaging the cladding on said optical fiber; a base member slidably mounted to said aligned blocks; and a fiber stop member pivotally mounted to said base member to permit the length of jacket to be severed on said optical fiber to be measured.

10. The optical fiber positioning apparatus of claim 9 wherein said base member is provided with a groove in the top surface thereof having a width equal to the width of said aligned blocks to slidably receive one of said blocks therein, said base member is further provided with an elongated slot therein, and said aligned block received in said groove is provided with a threaded bore in a bottom surface thereof to permit insertion of a bolt through said elongated slot into said bore to thereby secure said block to said base member.

11. The optical fiber positioning apparatus of claim 9 wherein pins carried by one of said aligned blocks are received by bores in the other of said aligned blocks to maintain alignment between said blocks.

12. The optical fiber positioning apparatus of claim 9 wherein a portion of said rectangularly cross-sectioned bore is tapered in an outward flare adjacent the opposite end from said counter bore to facilitate insertion of said jacketed optical fiber into said bore.

13. A positioning apparatus for a fiber optics stripper comprising:
   (a) a base member having a groove extending along the top surface thereof and an elongated opening positioned generally along the centerline of said groove from the top surface to the bottom surface of said base member;
   (b) a first block member having a width between first and second side surfaces thereof approximately equally to the width of said groove in said base member and adapted to be slidably received in said groove in said base member;
   (c) means for releasably securing said first block to said base member;
   (d) a groove positioned in the top surface of said first block member extending from a first end surface of said block to the opposite end surface and parallel to said groove in said base member when said first block member is inserted into said groove in said base member;
   (e) a plurality of locator pins extending perpendicularly from said top surface of said first block; ,
   (f) a second block member having a plurality of vertical bores in a bottom surface thereof in registry with said locator pins in the top surface of said first block, said vertical bores having a cross-section substantially the same as the cross-section of said locator pins and sufficiently larger to permit insertion of said locator pins into said vertical bores, said bores being positioned on said bottom surface of said second block to provide registry between said first end surface of said first block with a first end surface of said second block;
   (g) a groove extending along the bottom surface of said second block from said first end surface thereof to an opposite end surface and in registry with said groove in the top surface of said first block; and
   (h) a circular counter bore formed in said first end surfaces of said first and second blocks coaxial with said grooves in said first and second blocks, said circular counter bore having a diameter approximately equal to the outer diameter of nose portion of a stripper mechanism which is axially aligned with cutting blades in said stripper;
   whereby insertion of a jacketed optical fiber into said grooves in said blocks and insertion of said nose portion of said stripping mechanism into said counter bore will precisely align said coated optical fiber with said cutting blades of said stripping mechanism to permit cutting said jacket on said optical fiber without damaging said optical fiber or the cladding thereon.

14. An optical fiber positioning apparatus for an optical stripping device capable of providing precise axial alignment between an optical fiber to be stripped of its outer jacket and a stripping device comprising:
   (a) a base member provided with an elongated groove formed in one surface thereof and an elongated slot in said groove extending to the opposite surface of said base member;
   (b) a pair of aligned blocks slidable mounted on said base member and having a width equal to the width of said groove in said base member to permit insertion of one of said blocks into said groove;
   (c) a threaded bore in a bottom surface of said one of said aligned blocks to permit insertion of a bolt through said elongated slot into said threaded bore to thereby secure said block to said base member;
   (d) V shaped grooves formed in respective mating surfaces of said aligned blocks to thereby define a rectangularly cross-sectioned first bore haing a width approximately equal to the diameter of an unstripped optical fiber;
   (e) a counter bore in said positioning apparatus axially aligned with said first bore and dimensioned to precisely receive a portion of said stripping device in axial alignment with notched cutting blades within said stripping device to thereby axially align said notched cutting blades of said stripping device with the axis of said optical fiber to permit said notched cutting blades to sever said jacket on said optical fiber without damaging the cladding on said optical fiber; and
   (f) a fiber stop means pivotally mounted on said base member capable of being pivoted into a position of engagement with said optical fiber passing through said rectangular bore defined by said aligned blocks whereby the length of jacket to be stripped from a fiber may be controlled by threading said fiber through aid rectangular bore until the end of said fiber contacts said fiber stop and said alignment blocks are then moved away from said fiber stop until the distance between said blocks and said fiber stop with said fiber resting against it define the length of jacket to be removed from said optical fiber.

* * * * *